Sept. 15, 1953  W. G. SHERRY  2,652,262
ANTIJACKKNIFE FIFTH WHEEL COUPLING
Filed Oct. 19, 1950
2 Sheets-Sheet 2
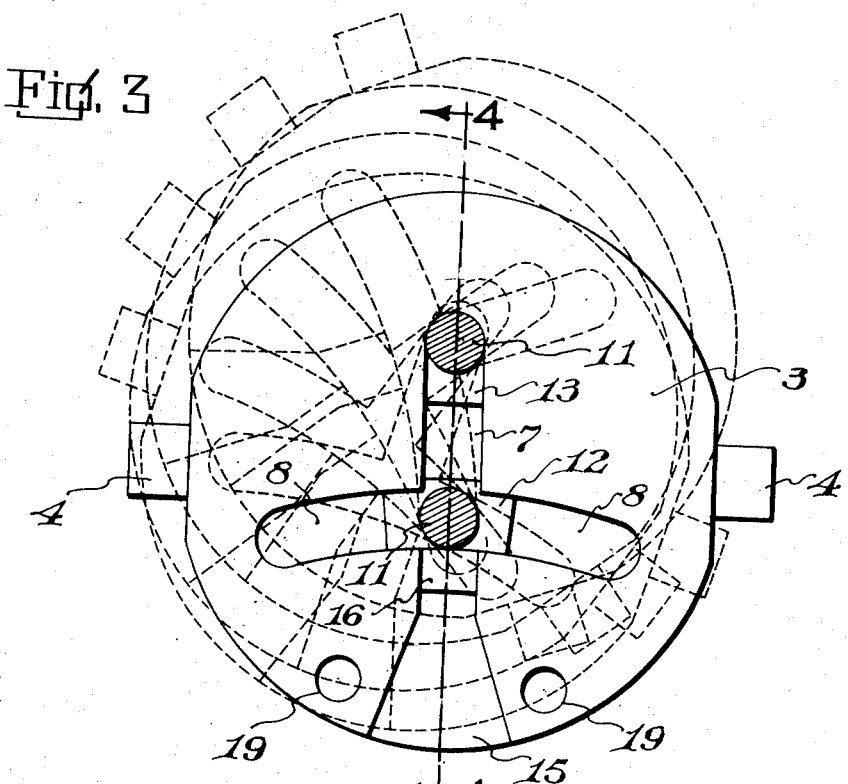
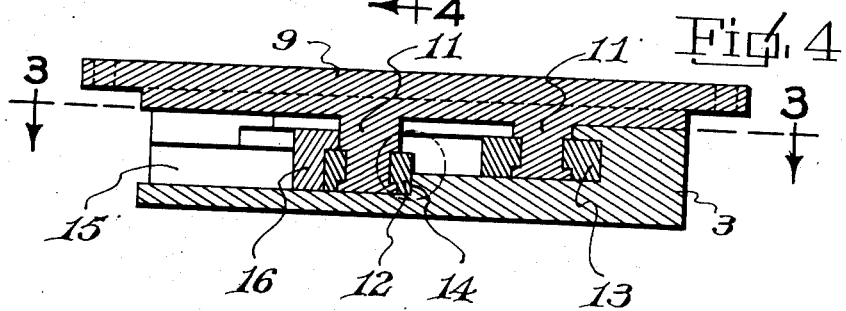
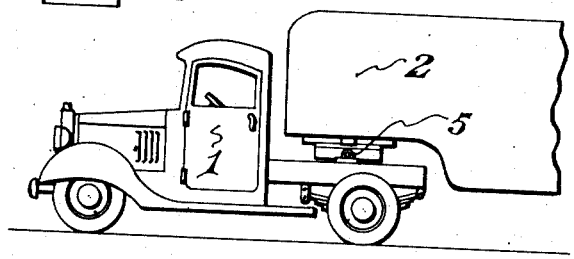
William G. Sherry
INVENTOR
ATTORNEY Patented Sept. 15, 1953

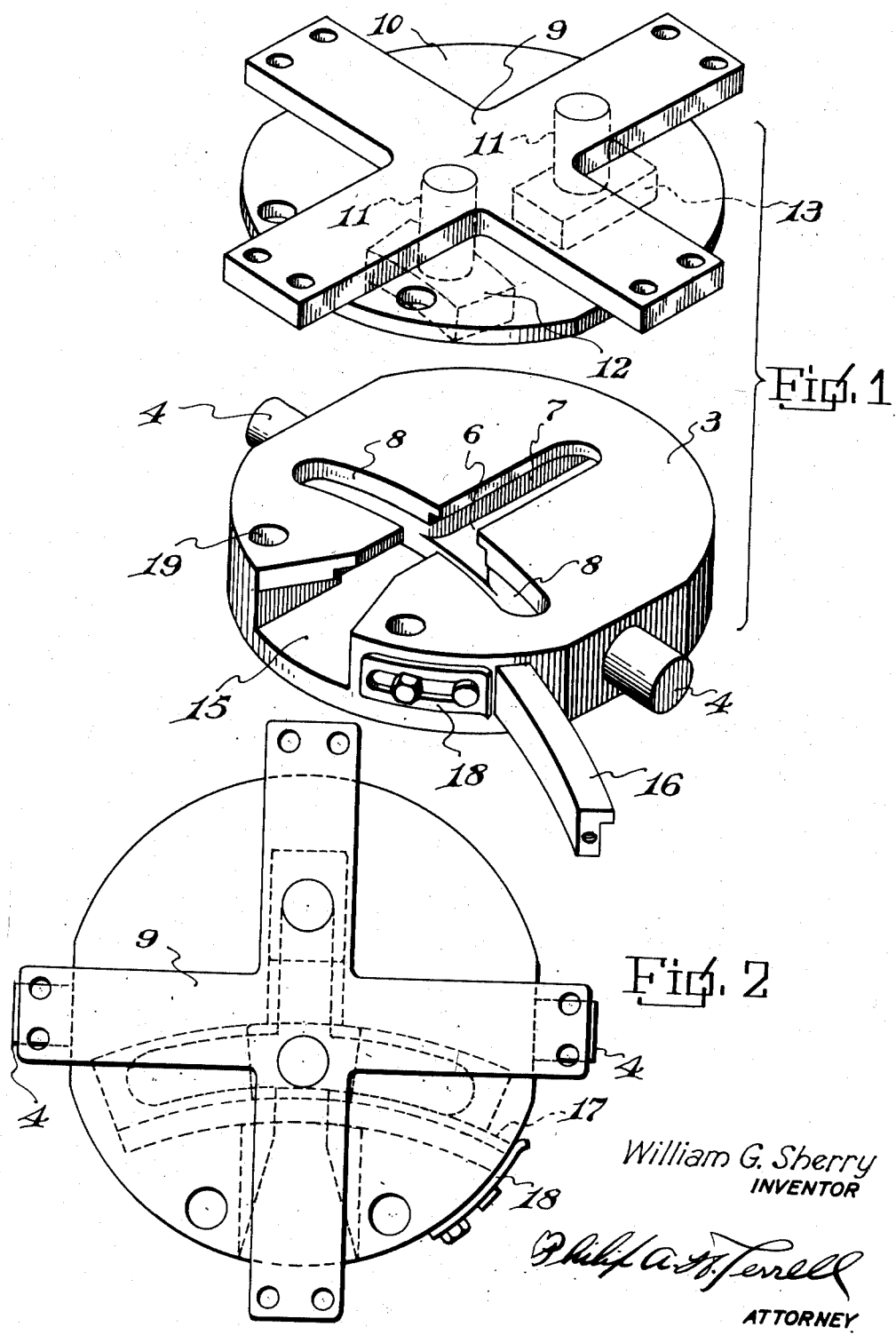

2,652,262

UNITED STATES PATENT OFFICE 2,652,262

ANTIJACKKNIFE FIFTH WHEEL COUPLING

William G. Sherry, Tulsa, Okla.

Application October 19, 1950, Serial No. 190,932

2 Claims. (Cl. 280—33.05)

1

The invention relates to fifth wheels for trailers and towing tractors, and has for its object to provide a fifth wheel provided with means whereby jack-knifing is prevented when the trailer over-rides the towing vehicle, which over-riding usually takes place on down grades and curves.

A further object is to provide a fifth wheel of the character set forth wherein the tractor carried element of the fifth wheel is provided with a T-shaped block guide slot carried in the upper face of the tractor carried element, and spaced slide blocks at fixed points on the trailer carried element, and slidably mounted in the T-shaped guide slots, and co-operating with the walls of the guide slots for retarding jack-knifing when the trailer carried element over-rides the tractor carried element, and at which time the blocks move into angularly positioned arms of the guide slot.

A further object is to place one branch of the T guide slot on the vertical longitudinal center of the tractor carried element and the other arms transversely of the tractor carried element and arcuately shaped.

A further object is to provide an arcuately shaped gate bar slidably mounted through the tractor carried element and adapted to close a passage longitudinally through the rear side of the tractor carried element, said passage and gate bar forming means whereby the slidable blocks can be positioned in the T-shaped guide slots.

With the above and other objects in view the invention resides in the combination and arrangement of parts as hereinafter set forth, shown in the drawings, described and claimed, it being understood that changes in the precise embodiment of the invention may be made without departing from the spirit of the invention.

In the drawings:

Figure 1 is a collective perspective view of the trailer elements.

Figure 2 is a top plan view of the fifth wheel.

Figure 3 is a top plan view of the trailer carried element with parts in section and taken on line 3—3 of Figure 4.

Figure 4 is a vertical longitudinal sectional view through the fifth wheel taken on line 4—4 of Figure 3.

Figure 5 is a side elevation of a tractor and the front end of a trailer, showing the fifth wheel applied thereto.

Referring to the drawings, the numeral 1 designates the usual form of tractor and 2 the front end of a conventional form of trailer, which

2 trailer front end is connected to the rear end of the tractor by the fifth wheel hereinafter set forth.

The fifth wheel comprises a lower element 3 having pintles 4 at opposite sides, which pintles are rockably mounted in conventional trunnions 5 on the rear end of the tractor as shown in Figure 5.

The lower element or member 3 is provided, in its upper face, with a T-shaped guide block slot 6 comprising a longitudinally extending arm 7, and the other two arms of the guide slot extend transversely and arcuately and designated by the numeral 8. Superimposed on the upper side of the lower member 3 is a trailer carried member 9, secured to the under side of the forward end of the trailer 2 by bolts or any other securing means. The trailer carried member 9 is provided with a plate 10, which plate registers with the upper side of the lower member 3 and has a bearing thereon. Extending downwardly from the under side of the plate 10 are lugs 11, which lugs extend downwardly into the arms of the T-shaped slot as shown in Figure 4, and pivotally mounted on the lower ends of the lugs 11 are guide blocks 12 and 13. Guide blocks 12 and 13 are substantially rectangular in shape. In the case of block 12, the block is slightly arcuate to conform to the radius of the slots 8. Block 12 rides from side to side in the arcuate guide slots 8 and during this movement the block 13, which is slidably mounted in the guide slot 7 moves longitudinally in the guide slot 7. In Figure 3, the various positions of the blocks in the T-shaped guide slots are shown during the making of a turn, all of which is indicated in dotted lines. It will be noted that when the trailer over-runs the tractor during the making of a turn to either side, the blocks will co-operate with substantially right angularly disposed sides of the slot arms, thereby breaking the over-running of the trailer in relation to the tractor and positively limiting or preventing jack-knifing when the lug 11 and the block 12 reaches the outer ends of the arcuate slots 8. It will be noted that the block 12 cooperates with an arcuate shoulder 14 on a lower level than the block 13, therefore upon the starting of the over-running by the trailer the shoulder 14 will take up the thrust at a lower level than the block 13.

The rear side of the lower member 3 in alignment with the slot 7 is provided with an inwardly extending passage 15 through which passage the blocks 12 and 13 may pass to the T-shaped guide slot 6 when assembling or connecting the trailer to the tractor. After the blocks 12 and 13 have been properly positioned within the T-shaped guide slots an arcuate gate bar 16 is forced inwardly through the passage 17 and the gate bar forms the rear surface of the slot ends 8. Gate bar is L-shaped as shown in Figure 4 and overlies the upper side of the block 12. After the gate bar is properly positioned, a slide latch 18 is moved over the end of the gate bar for holding it in closed position against displacement.

When it is desired to lock the fifth wheel against movement, particularly on straightaways, bolts or other locking means, not shown, may be passed through registering apertures 19 in the fifth wheel members. The locking means is operated from the tractor cab.

From the above it will be seen that a fifth wheel structure is provided which will take up the normal forward thrust when the trailer attempts to over-ride the towing tractor, and one wherein there is a floating king pin arrangement which will positively prevent jack-knifing on the curves and slippery streets, and on down grades, where the trailer, particularly one heavily loaded, has a tendency to over-ride the towing tractor.

The invention having been set forth what is claimed as new and useful is:

1. A tractor trailer fifth wheel, said fifth wheel comprising a lower member rockably mounted on the tractor, an upper member carried by the trailer and superimposed on the lower member, a T-shaped block guide slot in the upper side of the lower member, one arm of said guide slot being longitudinally disposed and the other arm of said guide slot being transversely disposed, downwardly extending members carried by the upper member on the longitudinal center thereof and extending into the transverse and longitudinal guide slots, a guide block rotatably mounted on the downward extending member extending into the longitudinal guide slot and a guide member rotatably mounted on the downwardly extending member extending into the transverse guide slot and transversely guided in said slot from side to side upon the rotation of the members in relation to each other, an inwardly extending passage in the rear side of the lower member and through which passage the guide members will pass and a transverse gate bar for the inner end of said inwardly extending passage and extending through a passage transversely and arcuately through the lower member and forming the rear wall of the transverse guide slot, said inwardly extending passage being in alinement with the longitudinally disposed arm of the T-shaped slot, said inwardly extending passage also being in communication with the transversely disposed arms of the T-shaped slot.

2. A device as set forth in claim 1 wherein the inner side of the gate bar is provided at its upper portion with a flange extending the length of the bar and overlying the upper side of the block in the transverse slot.

WILLIAM G. SHERRY.

References Cited in the file of this patent
UNITED STATES PATENTS

| Number | Name | Date |
|---|---|---|
| 1,995,920 | Gurton et al. | Mar. 26, 1935 |
| 2,056,262 | Edwards | Oct. 6, 1936 |